Aug. 8, 1933.    F. W. HOBAN    1,921,031
ART OF TESTING COINS OR OTHER TOKENS FOR GENUINENESS
Filed Sept. 11, 1930    5 Sheets-Sheet 1
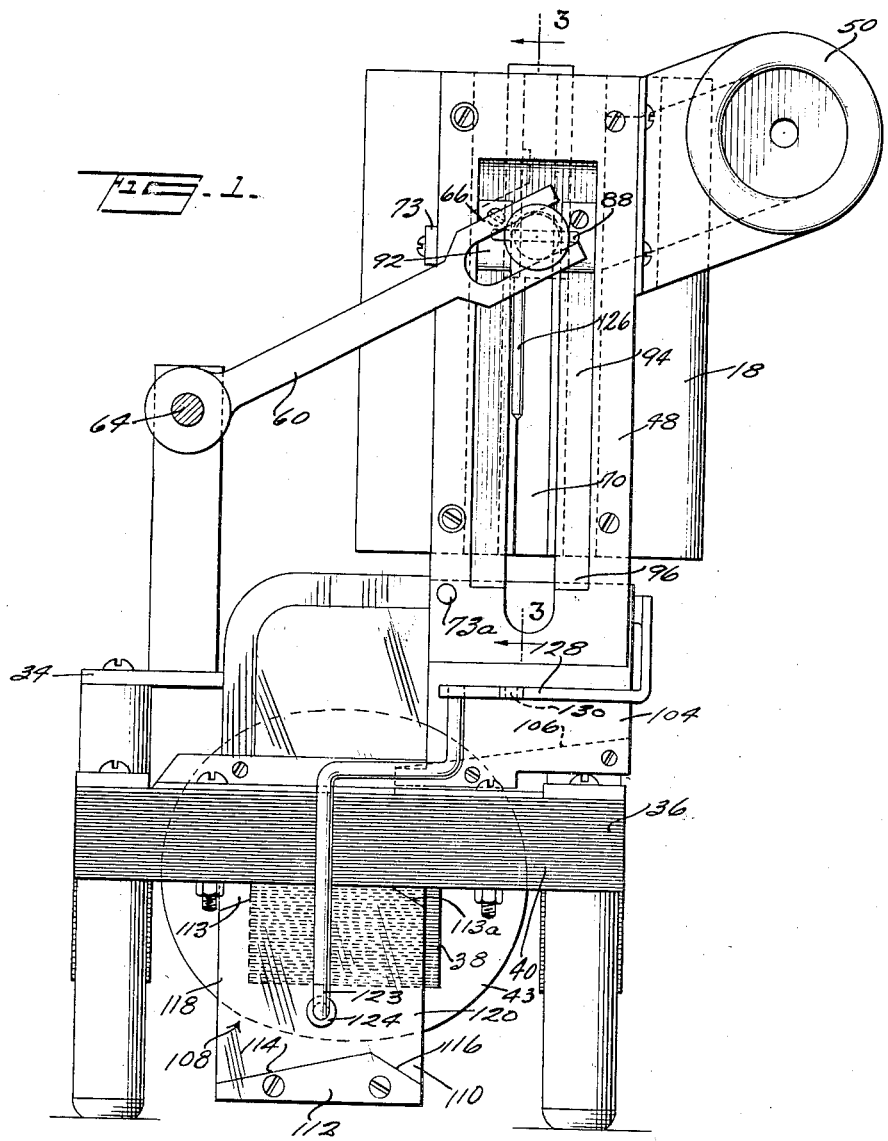
INVENTOR
Fairfield W. Hoban.
BY
Dyke and Schaines
ATTORNEYS

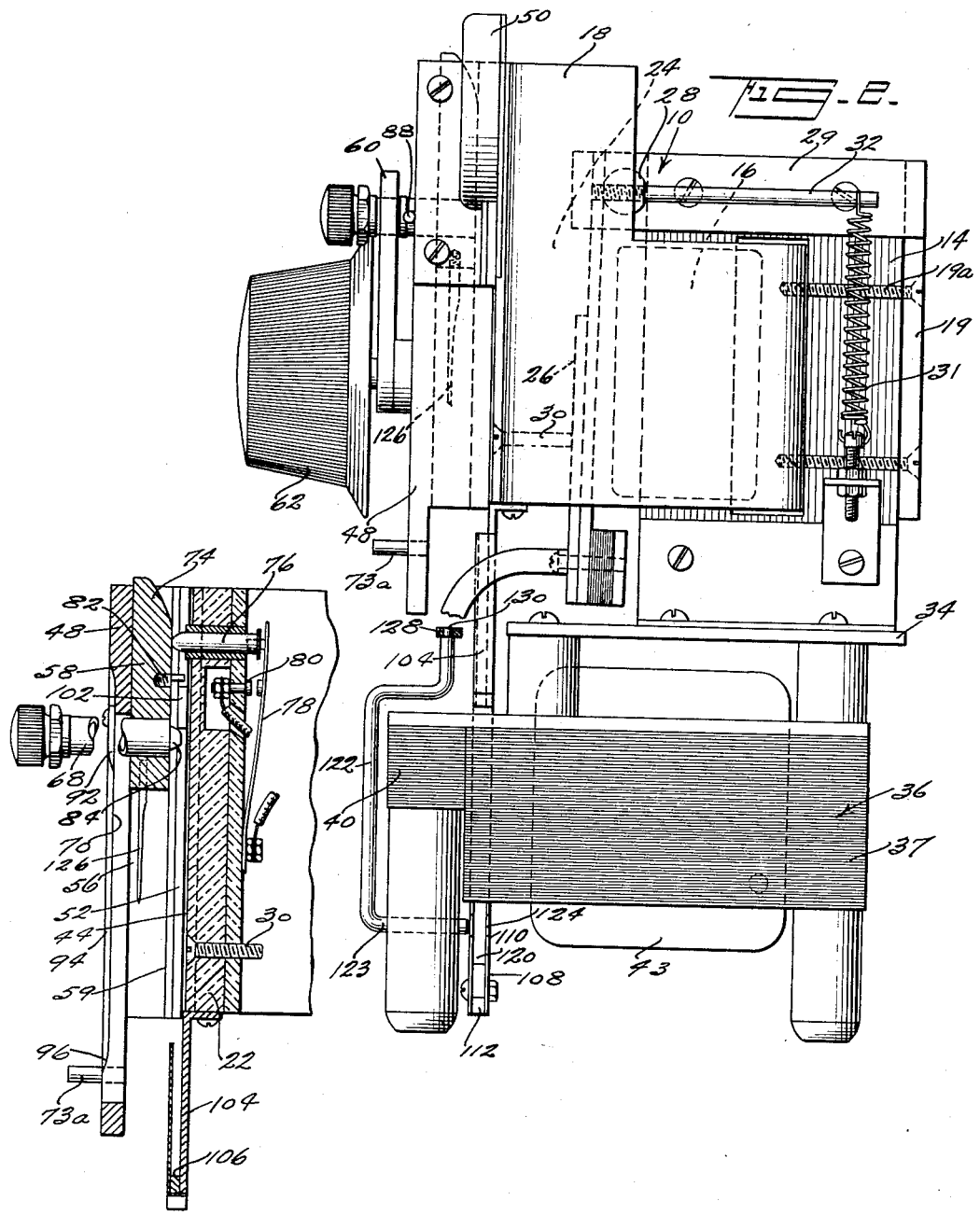

Aug. 8, 1933.  F. W. HOBAN  1,921,031
ART OF TESTING COINS OR OTHER TOKENS FOR GENUINENESS
Filed Sept. 11, 1930  5 Sheets-Sheet 3
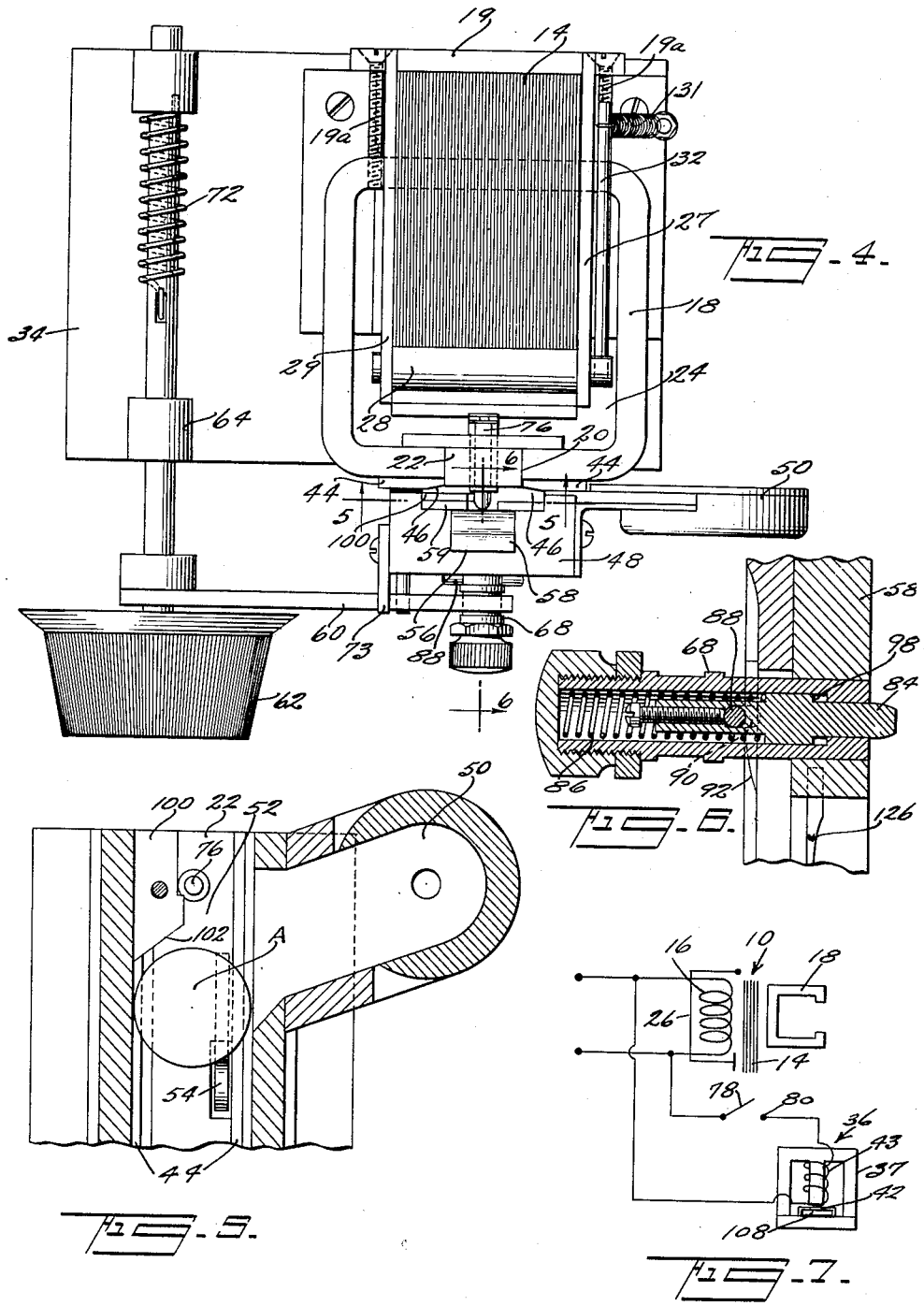
INVENTOR
*Fairfield W. Hoban.*
BY
*Dyke and Schaines*
ATTORNEYS

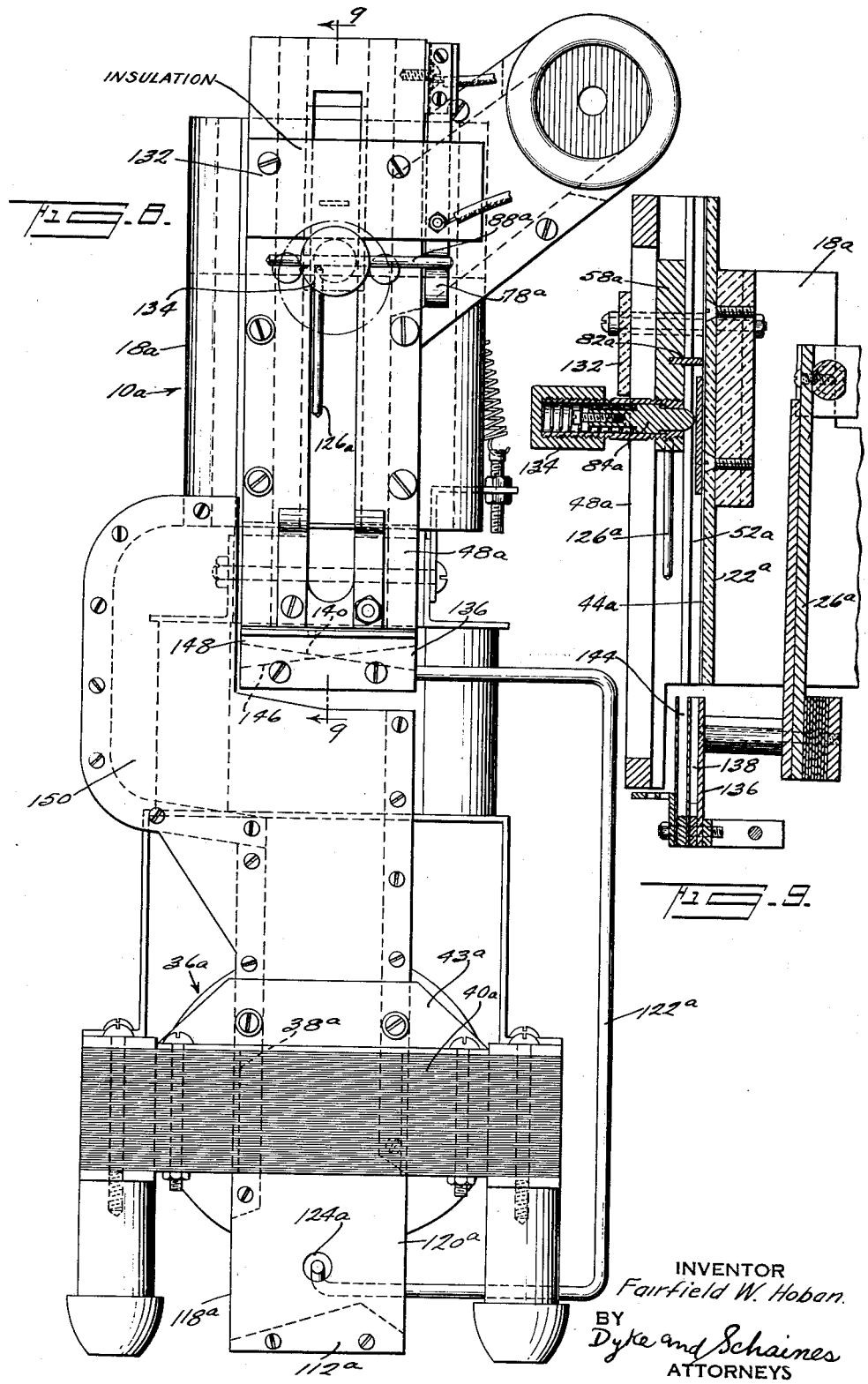

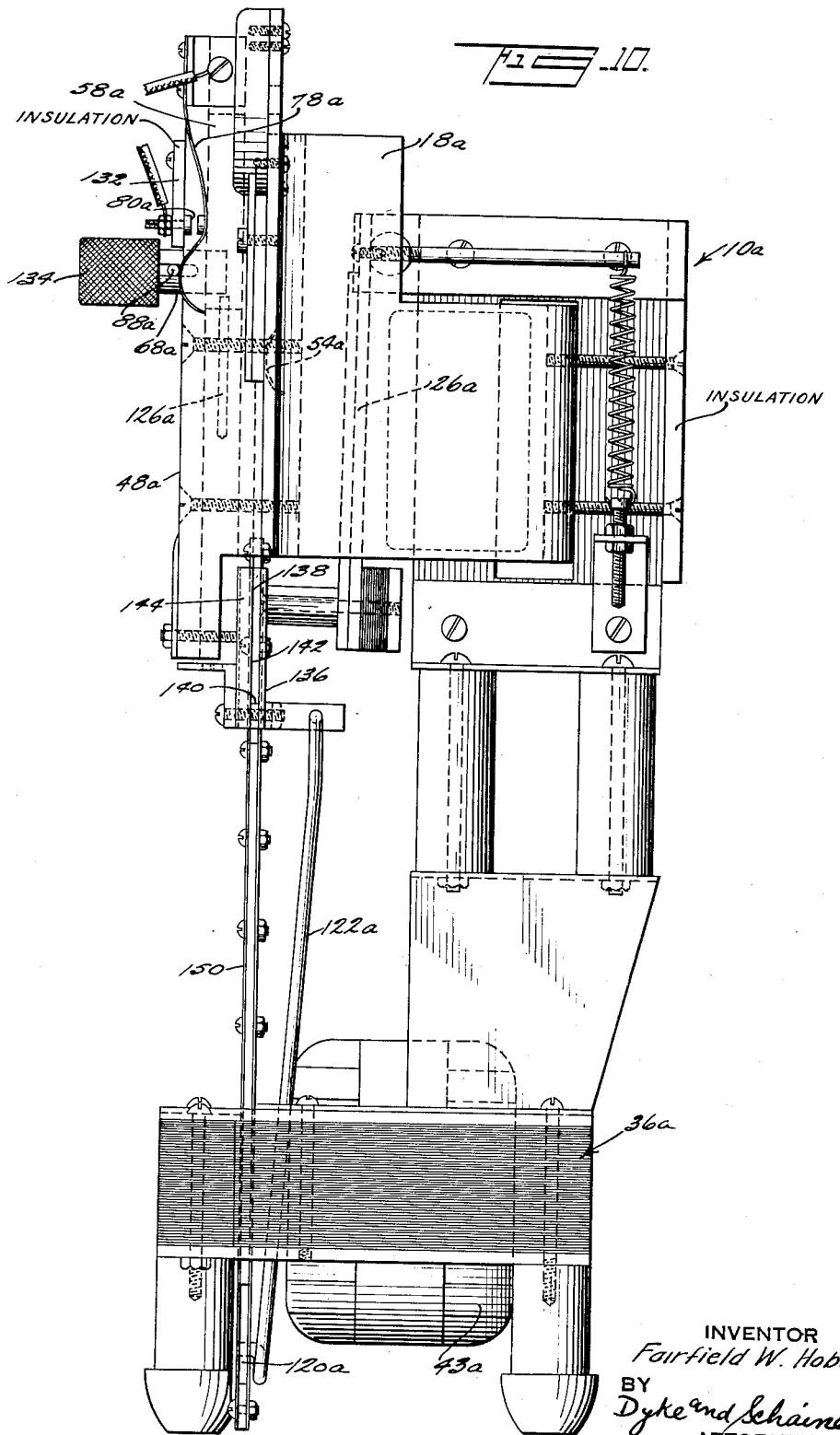

Patented Aug. 8, 1933

1,921,031

UNITED STATES PATENT OFFICE 1,921,031

ART OF TESTING COINS OR OTHER TOKENS FOR GENUINENESS

Fairfield W. Hoban, New York, N. Y., assignor to Fairfield Specialties Corporation, New York, N. Y., a Corporation of New York Application September 11, 1930
Serial No. 481,189

31 Claims. (Cl. 194—101)

My invention relates to improvements in means and methods for testing coins, tokens or like devices for genuineness, and for retaining or accepting the genuine pieces or devices and refusing or rejecting the spurious or counterfeit ones.

An object of the invention is to distinguish between the coins or tokens by reliance upon properties or qualities of the genuine coin or device not possessed by various spurious or counterfeit devices presented, such as the specific electrical resistance of the genuine coin or token, or the reaction thereof to a fluctuating magnetic or other field, the spurious devices being rejected because of the absence of one or the other of said specific properties or qualities therein.

Another object of the invention is to effect the elimination or detection of the spurious tokens by the effects of a current of predetermined value or amperage obtained when a coin or token of predetermined resistance is presented for test and not obtained when other coins or tokens are presented.

Another object of the invention is to subject the various coins, tokens or devices to a resistance test for distinguishing between most spurious devices and the genuine, and to a further test, as by subjecting the devices to a fluctuating magnetic or other field, capable of distinguishing between spurious and genuine devices of approximately the same resistance, for example, slugs composed of certain forms of copper and silver coins.

Another object of the invention is to control the disposition of the coins or devices subjected to the second test by the magnetic effects produced upon the first test in the presence of the genuine coin or other token of approximately the same resistance as the genuine.

Another object of the invention is to control the current in testing the coins or tokens for resistance by causing variations in the impedance of the circuit thereof in the presence of the coin or token to increase the current flow, and, in the presence of the coin or token of a predetermined resistance, utilizing the magnetism developed to instantaneously increase the impedance of the circuit and reduce the current flow, whereby to economize in the use of current.

Other objects will in part be obvious and in part be pointed out hereinafter.

To the attainment of the aforesaid objects and ends, my invention consists of the novel features of construction, and in the combination, connection and arrangement of parts, and in the steps constituting my said methods, hereinafter more fully described and then pointed out in the claims.

In the accompanying drawings:

Fig. 1 is a front elevation of one form of apparatus constructed according to and embodying my said invention;

Fig. 2 is a side elevation thereof;

Fig. 3 is a section on the line 3—3 at Fig. 1;

Fig. 4 is a plan thereof;

Fig. 5 is a section on line 5—5 at Fig. 4;

Fig. 6 is an enlarged section on the line 6—6 at Fig. 4;

Fig. 7 is a diagram thereof;

Fig. 8 is a front elevation showing a modification;

Fig. 9 is a section thereof on the line 9—9 at Fig. 8; and

Fig. 10 is a side elevation thereof.

Referring to the drawings, I utilize an electrical element 10 resembling a transformer, and constituting the first means for testing the coins, tokens or like devices. This element includes an endless magnetic core 14, preferably of laminated silicon construction, and a multi-turn primary coil 16 embracing the vertical front portion of the core connected in circuit with a source of alternating current and constituting a choke or impedance. A conductive member or secondary coil 18, preferably of copper, for controlling or reducing the impedance of the coil 16 is mounted to embrace the forward portion of the core 14 and the coil 16 mounted thereon. The member 18 is secured in insulated position on the core by means of an insulating plate 19 at the back of the core connected to the member 18 by screws 19ª.

The conductive member 18 is relatively elongated vertically and is interrupted at the front thereof, as indicated at 20, coextensively with its depth. The gap thus formed is closed by a strip of insulating material 22. The member 18 is sufficiently spaced from the primary coil 16 to provide clearance 24 for receiving a magnetic armature 26, preferably at least in part of silicon composition, pivoted at its upper end 28 to the forward ends of the side plates 29 secured to core 14, and extending downwardly to be attracted at its lower end by the core 14. The armature is normally held in disengaged or open position against a stop 30 by the spring 31 anchored at its lower end to the support 34 and connected at its upper end to the arm 32 which forms with the armature 26 a bell crank lever.

The structure thus formed is disposed upon the support 34 mounted upon a second electrical element 36 including a silicon core 37 having an intermediate leg 38 extending towards but spaced from the forward side 40 of the core to provide a space therebetween as indicated at 42, Fig. 7. A coil 43 is disposed about the core arm 38 in circuit with the source of alternating current for creating a fluctuating magnetic field across the gap 42, and thereby providing means for subjecting the token or device to further test for effecting or insuring the separation of the genuine from all spurious devices, including the separation of silver and copper devices.

In order to increase the conductivity between the copper member 18 and the coins or devices when it is desired to close the circuit of the copper member 18, elongated silver strips 44 are disposed at the front of the copper member 18 at opposite sides of the insulating strip 22, and these strips constitute contacts which the coins or tokens engage for closing the circuit 18. Genuine silver coins have projecting milled edges so that only diametrical opposite points of the edges engage the contacts. The inner portions of the contacts 44 are therefore reduced, as indicated at 46, so that irrespective of the smoothness of the coin or slug substantially equal surface engagements are obtained and the current variations become substantially a pure function of the resistances of the various materials tested without variation due to difference in surface contact.

The contacts 44 are enclosed by a plate member 48 secured to the member 18 and silver portions 44, but insulated therefrom and having a lateral coin inserting slot 50 at the upper end thereof communicating with a vertical coin slot 52 intermediate the plate 48 and the contacts 44, the plate and the contacts extending substantially coextensively with the member 18 for maintaining the coin or device in contact to close the circuit thereof for a time sufficient to develop the required current for actuating the armature 26.

When the coin or device A is initially inserted it is retained in elevated position by a spring catch 54 secured to the back of the member 22 and projecting through a slot therein. The face plate 48 is provided with a vertical recess 56 receiving a plunger 58 retained in place by the strips 59 and adapted to slide up and down. The plunger is actuated by the arm 60 and knob 62 pivoted in bearings 64 on the support 34, the outer end of the arm having a bifurcation 66 embracing a tubular member 68 secured to the plunger 58 and riding in a vertical slot 70 through the front of the face plate. The plunger is normally retained in elevated position by the spring 72 and the travel thereof is limited by the stops 73 and 73ᵃ.

The plunger 58 is provided with a cam portion 74 adapted in the elevated position thereof to force back a pin 76 sliding through the insulating member 22 and cooperating with a spring contact 78 to maintain the same out of engagement with the contact 80 in the elevated position of the plunger and to close the contacts when the plunger is depressed to energize the coil 43.

The plunger 58 also carries a coin depressing pin 82 located above the edge of the coin A when the same is being held by the catch 54 and a coin pressing pin 84 retained out of engagement with the coin in the elevated position of the plunger.

The pressing pin 84 is slidably received in the tubular member 68 and is normally pressed forward by a spring 86. The pin 84 is provided with a transverse pin 88 projecting through slots 90 in the tubular member 68 and, in the elevated position of the plunger 58, riding on the cam portions 92 on the front of the face plate 48, thereby retracting the pin 84. The front of the face plate is recessed at 94 to allow movement of the transverse pin 88 without dragging when the plunger is depressed and raised.

When the plunger is depressed the pin 84 is moved inwardly to press the coin firmly against the contacts 44 and the coin depressing member or pin 82 engages the coin or other device to move the same downwardly over the contacts. As the plunger approaches its lowermost position the pin 88 rides upon the inclined or cam portions 96 to release the coin A. Upon return movement of the plunger 58, dragging of the pin 84 on the opposing insulating part 22 is prevented by the provision of a shoulder 98 on the pin 84 adapted to engage a part of the member 68, thus preventing undue projection of the pin 84 when not in contact with a coin or device.

Should two coins or devices be inserted into the slot 50, upon depression of the first coin by the member 82 the second coin will follow above such member. Upon return movement of the member 82 however, it will raise the second coin and cause the same to enter the branch 50 by engagement with a coin deflecting plate 100 arranged in the slot 52 opposite the entrance portion 50 and having an upwardly inclined lower edge 102. After the pin 82 reaches its uppermost position, such second coin returns and is held by the catch 54 ready to be tested in turn.

The coins or tokens after being released by the presser pin 84 drop into a chute portion 104 secured below the guideway 52 in alignment therewith and having an inclined floor 106 for deflecting the coin or device laterally into a vertical chute 108 disposed between the core portions 38 and 40 in the path of the flux. The chute 108 consists of opposing wall portions 110 secured together in spaced relation by suitable spacers including the end spacer 112 serving as a floor and the lateral spacers 113 and 113ᵃ. The spacer 112 has oppositively inclined edges 114 and 116, the former of which is the longer, for deflecting the coins or devices laterally from the chute through the spurious device outlet 118 and the good coin outlet 120.

The armature 26 carries a coin or device deflecting means having an end 123 which, when the armature is actuated towards the core 14 enters a hole 124 located centrally of the chute 108 near the lower end thereof. To prevent the armature from returning to normal position when the circuit of the secondary 18 is opened by disengagement of the coin from the contacts 44, the plunger 58 is provided with a pin 126 adapted to engage in front of a transverse portion 128 of the deflecting means to hold the end 123 thereof in the hole 124. If the armature 26 remains in normal position when the plunger is depressed, the pin 126 enters a hole 130 in said portion 128 which hole provides clearance for the pin and also serves to lock the deflecting means 122 in position with the end thereof retracted.

Good coins or tokens passing through outlet 120 may be received into a suitable container or diverted for actuating other devices, such as a bell, or other signalling or indicating devices, or mechanisms to be controlled by the coins, such as telephone pay boxes, turnstiles, vending machines, money changers, or the like, with which mechanisms the detecting means embodying the present invention may be incorporated.

The spurious devices passing through outlet 118 are returned to the user. The entire mechanism is enclosed in the usual casing to prevent surreptitious interference with the operation thereof.

Similar to the arrangement disclosed in my copending applications Serial No. 357,715, filed April 24th, 1929, and Serial No. 407,092, filed November 14th, 1929, the means 122 controlling the destination of the coins or devices is controlled magnetically by the magnetism of core 14 resulting from and proportional to the current flow through the coil 16. The weight of the armature and the tension of the spring 31 are adjusted to require a magnetic influence of predetermined intensity before the armature can be actuated by the core 14.

The magnetism of the core depends on the amperage of the current through the coil 16 and this in turn is controlled by the member 18. When a good coin or token, such as on ardinary silver coin engages the contacts 44 and closes the gap thereof, a current of predetermined amperage is developed in the coil 16 which in turn develops a magnetism in the core 14 of predetermined intensity, sufficient to attract the armature 26 and cause the end 123 to enter hole 124. Coins or tokens having a resistance greater than that of the good or desired coin or device cannot cause the development of sufficient current in the coil 16 to actuate the armature 26, and hence such spurious coin or token passes out, as hereinafter more fully described, through outlet 118, and is returned to the user. In such event, the pin 123 being retracted, the spurious device drops on the longer incline 114 and is deflected to the left looking at Fig. 1. When the end 123 is inserted in the hole the clearance between the pin 123 and the spacer 113 is smaller than the coin, and the coin is therefore deflected through the outlet 120.

I have found, however, that certain slugs which may be employed surreptitiously are composed of copper having when uncorroded a resistance which is approximately close to the resistance of a genuine silver alloy coin. These slugs, unless the apparatus is extremely sensitive, are likely to operate the armature 26 like a genuine coin does.

To prevent the acceptance of such copper devices as though the same were genuine by failure of the electrical element 10 to distinguish therebetween, the devices inserted and actuating the armature 26 are subjected to further test enroute. In the present invention the devices inserted after being tested by the element 10 pass through the chute 108 which is disposed in the path of a magnetic or other alternating flux generated by the electrical element 36 connected to an alternating current source. The flux generated is of a strength sufficient to prevent passage of a copper device therethrough under the momentum developed in the distance dropped. The genuine silver coin however readily passes through the field, and, inasmuch as the pin 123 then obstructs the passage, the coin passes out through outlet 120. The copper device sticks, as it were, in the chute and is prevented from dropping out as long as the coil 43 remains energized. The cause of this appears to be an eddy current motor effect, which, while effective to enable distinguishing between two substances, such as copper and silver devices, is not utilized for distinguishing between all slugs and silver coins. While in this embodiment of the invention all slugs, whether actuating the deflector 122 or not, by operation of the element 10, pass through the fluctuating field, it is not required, except in the case of copper, that they do so or that the field should prevent passage of such slugs therethrough. This is because the slugs other than copper not having actuated the deflector 122, would be deflected into the proper outlet anyway. The chute 108 because of magnetic effects therearound is therefore made of mica or other non-magnetic material so that iron slugs will not stick therein and thereby fail to be returned.

The apparatus depends primarily for operation on characteristic properties or qualities of genuine or good coins or tokens such as the silver, copper and nickel alloy coins of the United States and may be employed for testing the genuineness of coins of various denominations. The characteristic of the coin which is relied on is its electrical resistance. The silver coin has a resistance lower than that of any other metal, except certain forms of copper, from which slugs or spurious coins are usually made, such as iron, aluminum, lead and the like, and the apparatus herein shown and described as one embodiment is arranged for operation with silver coins.

In operation, when the apparatus is not in use and the gap 20 is open, the high impedance of the coil 16 and core 14 effectively retards or reduces the flow of alternating current from the main line for the purpose of obtaining an economy in the use of current.

With the plunger 58 in its uppermost position, the contacts 78 and 80 are open and the coil 43 deenergized, and the presser pin 84 is in retracted position. When the device or coin A of the proper diameter is inserted, it slides into the chute 52 where it is retained by the catch 54. The knob 62 is then rotated to depress the plunger 58 which releases the pin 84 and causes the same to press the coin or device firmly against the contacts 44, while the pin 82 engages the edge of the coin to cause the same to slide downwardly over the contacts which are elongated to cause sufficient duration of contact or ride thereover to enable the building up of current in the coil 16. The coil 43 becomes energized when the plunger 58 disengages contact 78.

If the device inserted is a metallic one of the proper size but of a different material from that of genuine coins, or possibly copper, the same bridges the gap 22 to cause some increase of current in the coil 16, but not enough to cause the actuation of the pivoted member 26.

With the apparatus shown, when a silver coin, or in some instances a copper slug closes the secondary gap 22 the increase in current strength or amperage in coil 16 resulting from decrease in impedance will be sufficient to actuate member 122 and move end 123 into hole 124. Thereupon the pin 126 moves into engagement with the part 128 to lock the parts in position to retain the end 123 in the hole 124. This is particularly necessary because when the armature 25 closes it becomes, in effect, a part of the core 14 located within the member 18 and the increase flux through the member increases the impedance and economically reduces the current. When the plunger 58 reaches its lowermost position the pin 88 rides on the inclines 96 to retract pin 84 which releases the coin or other device which drops through the chute 108, the current in coil 16 reducing.

If the gate 123 is open the slugs either pass through the fluctuating field and out through the outlet 118 or are prevented from passing out until the plunger 58 is released and opens the circuit of the coil 43 to deenergize the same, when the slug will drop out.

If the gate 123 is closed, a silver coin will pass readily through the fluctuating field and out at 120. A copper slug will be prevented from passing out because of the fluctuating field. When plunger 58 returns however the pin 126 first releases the gate 122 and then deenergizes the coil 43 so that the copper slug drops out through the outlet 118.

My apparatus rejects coins or devices which are not of the proper size or denomination or which are of non-conducting material, thereby preventing the use of a large class of slugs or other spurious pieces made of substances such as glass, fibre, or the like.

At Figs. 8, 9, and 10 is illustrated a modification comprising the resistance testing element 10$^a$ which is substantially identical in construction with the element 10 illustrated at Figs. 1 to 6. An insulating member 22$^a$ is disposed between the gap of the secondary member 18$^a$ and supports the coin catch 54$^a$. In this embodiment the contacts 78$^a$ and 80$^a$ for controlling the electrical element 36$^a$ for causing the fluctuating field are mounted on the face plate 48$^a$, the contact 78$^a$ being mounted on the face plate and the contact 80$^a$ being mounted on an insulating piece 132 secured to the face plate to insulate the contact therefrom.

The face plate receives the plunger 58$^a$, carrying the coin pressing pin 84$^a$, coin depressing member 82$^a$, and locking pin 126$^a$ similar in construction and purpose to the parts shown at Figs. 1 to 6. In this form, however, the contact 78$^a$ lies in the path of the transverse pin 88$^a$ to retain the circuit of the coil 43$^a$ open when the plunger 58$^a$ is in its uppermost position, the plunger being actuated by providing a knurled finger piece 134 on the tubular member 68$^a$, thereby dispensing with the parts 60 and 62 shown at Figs. 1 to 6.

In this form of the invention, the armature 26$^a$ carries a coin or token diverting or controlling member 136 having a slot 138 normally in alignment with the slot 52$^a$ containing the gap bridging contacts 44$^a$, and serving to receive the coin or other device therefrom. The slot 138 has an inclined floor 140 and a lateral opening 142 for the escape of the device therefrom. The member 136 also includes a parallel slot 144 adapted to align with the slot 52$^a$ when the armature 26$^a$ is actuated and serving to receive the coin or device therefrom. This slot 144 is provided with an oppositely inclined floor 146 and a lateral opening 148 at the opposite side adapted to align with a vertical chute 150 when the armature is attracted. The chute is disposed between the core portions 38$^a$ and 40$^a$ of the element 36$^a$ in the path of the fluctuating field as in the structure above described. The lower end of the chute 150 is closed by a spacer 112$^a$ similar in construction and arrangement to the portion 112, Fig. 1, and serving to divert the coins or devices through the lateral opening 118$^a$ when the device diverting means 122$^a$ is withdrawn from the opening 124$^a$.

The diverting means 122$^a$ is carried by the member 136 and is arranged to enter the hole 124$^a$ located as in Figs. 1 to 6, when the armature 26$^a$ is in normal position. This is the reverse of the position of member 122. When the member 122$^a$ obstructs the chute 150 the coin or device is deflected through the lateral outlet 120$^a$.

As in the first modification described, the coin or device is inserted and dragged over the contacts 44$^a$, the depression of the plunger 58$^a$ energizing the coil 43$^a$. When the coin or device is one not having approximately the same resistance as the genuine, the armature 26$^a$ is not actuated and such coin or device drops out of the lateral opening 142 and is returned. In this modification therefore the spurious coins of too great resistance do not traverse the chute 150 which may therefore be made of iron, since iron slugs subject to magnetic effects do not pass therethrough.

When, however, the coin or device is a genuine one, or one having approximately the same resistance as the genuine, the armature 26$^a$ is actuated and as the plunger 58$^a$ descends the pin 126$^a$ enters a hole in the member 136 to lock the same in position to divert the coin or device into chute 150, and retains the same in such position as the magnetism holding armature 26$^a$ decreases due to the temporary increase of flux through the armature 26$^a$ and member 18$^a$ or to the disengagement of the coin or device from contacts 44$^a$. The actuation of the armature 26$^a$ moves member 122$^a$ out of the way. The device entering the chute 150, if the same is a genuine coin, passes through the fluctuating field and out through the opening 118$^a$. If the same is a copper device the fluctuating field serves to block the passage of the device so that genuine coins only can pass out through passage 118$^a$. When the plunger 58$^a$ is returned, the pin 126$^a$ releases the armature, causing the member 122$^a$ to enter the hole 124$^a$, and as the plunger opens the contacts 78$^a$ and 80$^a$, the coil 43$^a$ deenergizes to release the copper slug and allow it to pass out through opening 120$^a$.

In both forms of the invention herein disclosed, as in the forms described and claimed in the above referred to applications, the armature controls the disposition of the genuine coins, even though said armature is sometimes actuated in the presence of a copper slug.

In the form of the invention illustrated at Figs. 1 to 6, the single member 122 controls the disposition of all the spurious devices and the genuine ones, the devices all traversing the same path, and a single outlet being provided for the spurious devices. In the form illustrated at Figs. 8 to 10, two outlets are provided for the spurious devices, the armature 26$^a$ when responding to a predetermined resistance diverting the coins or devices into the chute 150, and controlling the member 122$^a$ to enable the control of the disposition of the genuine devices and the copper slugs.

In my invention, therefore, the element 10 or 10$^a$ serves to detect the genuine device and to control the disposition thereof relative to the spurious ones. The element 36 or 36$^a$ serves to screen or filter out, as it were, or block, the copper device, which has operated the element 10 or 10$^a$ like a good coin, to prevent passage thereof to the good coin outlet without preventing passage of the good coin, and this blocking or screening out is accomplished by utilizing differences in properties between the copper device and the silver capable of being utilized in an effective manner. The fluctuating field being an intangible medium effectively blocks the undesired device and at the same time offers no obstruction to the passage of the good coin.

The diverting means 122, or 136—122$^a$, is responsive only to a predetermined current strength or amperage such as obtained when a genuine coin or token closes the gap of member 18—18ª for indicating or making known the character of the token or coin, whether the same is genuine or spurious, and/or for controlling the disposition of the coin, token or like device according to the character thereof.

The invention is applicable for testing coins such as silver, which has a resistance lower than slugs of other metals usually employed, or for testing coins such as copper or nickel-copper alloys which have resistances intermediate the resistances of slugs of the various metals, some of which may have a lower resistance and some of which may have a higher resistance than a genuine coin or token.

The impedance means 16 serves to effectively retard or reduce the flow of alternating current when the same is not needed. When the coin or token closes the gap the coin is traversed by a relatively small current incapable of causing sparking or unduly heating the coin, and the resulting increase in current through the coil 16 is gradual and inversely proportional to the coin resistance. Were the circuit of the testing means controlled by cutout or circuit makers or breakers the closing thereof would cause momentary increases of current flow corresponding to that for genuine coins or tokens even in the presence of a false coin, resulting in the inadvertent acceptance of such false coin or device by the diverting means. The arrangement of the armature 26—26ª within the member 18—18ª also tends to reduce the current flow immediately upon engagement of the armature with the core.

In my invention, the elimination or detection of the spurious devices is accomplished electrically within a limited space and without undue complexity in the number of tests imposed. The spurious metallic devices are largely eliminated by rejecting those which do not correspond with the silver coin in resistance, and where such test is not infallible, as in the case of silver and copper absolutely universal and one hundred percent elimination is insured by subjecting the devices to the effects of the fluctuating field adjusted to differentiate between silver and copper without being required to distinguish other slugs previously eliminated.

Having thus described my invention, what I claim and desire to secure by Letters Patent is:

1. The herein described method of distinguishing between genuine and spurious coins, tokens or like devices which consists in subjecting the device to a test for electrical resistance to distinguish between the genuine devices and spurious devices except those having approximately the same resistance as the genuine, and then subjecting the device to a further test for distinguishing between the genuine ones and spurious ones of approximately the same resistance as the genuine.

2. The herein described method of distinguishing between genuine and spurious coins, tokens or like devices which consists in subjecting the device to a test for electrical resistance, controlling thereby the disposition of the device, and preventing passage of spurious devices of substantially the same resistance as the genuine to the point of disposition of the latter.

3. The herein described method of distinguishing between genuine and spurious coins, tokens or like devices which consists in subjecting a device to a test for electrical resistance, and to the action of a fluctuating magnetic field.

4. The herein described method of distinguishing between genuine and spurious coins, tokens or like devices which consists in subjecting a device to a test for electrical resistance, and passing the device over a path subject to the action of a fluctuating magnetic field to distinguish between a genuine device and one of approximately the same resistance as the genuine.

5. The herein described method of distinguishing between genuine and spurious coins, tokens or like devices which consists in subjecting the device to a test for electrical resistance, controlling thereby the disposition of the device, and passing the device over a path subject to the action of a fluctuating magnetic field to prevent delivery of a spurious device of approximately the same resistance as the genuine to the point of disposition of the genuine.

6. The herein described method of distinguishing between genuine and spurious coins, tokens or like devices which consists in subjecting the device to a test for electrical resistance, utilizing a current of predetermined amperage developed in the presence of a genuine device to the exclusion of currents of other amperages for controlling the disposition of the device, and passing said device over a path subject to the action of a fluctuating magnetic field for preventing passage of a spurious device of approximately the same resistance as the genuine to the point of disposition of the genuine device.

7. The herein described method of distinguishing between genuine and spurious coins, tokens or like devices which consists in presenting a device to a circuit and utilizing the device to vary the current in inverse relation to the electrical resistance of the device, translating the current of the amperage obtained in the presence of a genuine device of silver composition to the exclusion of current of other amperages into mechanical movement, controlling thereby the disposition of the device, and passing the device over a path subject to a fluctuating magnetic field to prevent passage of copper devices of substantially the same resistance as the genuine to its point of disposition.

8. The herein described method of distinguishing between genuine and spurious coins, tokens or like devices which consists in subjecting the device to a test for electrical resistance, controlling thereby the disposition of the device in response to a current of predetermined amperage developed in the presence of a genuine silver coin or a copper device of approximately the same resistance, and passing the device to its destination over a path subject to the effects of a fluctuating magnetic field capable of preventing passage of a copper device therethrough while allowing passage of a silver device.

9. The herein described method of distinguishing between genuine and spurious coins, tokens or like devices which consists in distinguishing between genuine coins of silver composition and spurious devices of other resistances by testing the resistance thereof, and distinguishing between the genuine devices and copper devices of approximately the same resistance as the genuine by passing the device over a path subject to the action of a fluctuating magnetic field capable of preventing passage of a copper device therethrough while allowing passage of the genuine device.

10. An apparatus of the character described comprising means for testing coins, tokens or like devices for electrical resistance to distinguish between the same when the resistances are different, and means for differentially testing the genuine devices and spurious ones of approximately the same resistance to also distinguish therebetween.

11. An apparatus of the character described, means dependent upon differences in electrical resistance for distinguishing a large class of spurious devices from genuine silver coins, tokens or like devices, and means dependent upon differences in another property of the genuine devices and copper ones of approximately the same resistance for distinguishing therebetween.

12. An apparatus of the character described comprising electrical resistance testing means capable of discriminating between genuine conductive devices and spurious ones of resistances differing therefrom, means for differentially controlling the disposition of the genuine and spurious devices, and means for preventing spurious devices of approximately the same resistance as the genuine from passing to the point of disposition of the genuine device.

13. An apparatus of the character described comprising means for testing coins, tokens or like devices for electrical resistance, means actuated thereby for controlling the disposition of the devices, and means for passing certain of the devices through a fluctuating magnetic field.

14. An apparatus of the character described comprising means for testing coins, tokens or like devices for electrical resistance, a chute descending therefrom, means for causing a fluctuating magnetic field to traverse said chute, and means at the lower end of said chute actuated by said testing means for controlling the disposition of the devices.

15. An apparatus of the character described comprising a circuit, means for presenting coins, tokens or like devices to said circuit, and subjecting the same to the effect thereof to control the current in said circuit in accordance with the composition of said devices, said circuit when subjected to a device of definite resistance developing a current flow of a predetermined amperage, means operated in response to said current flow of predetermined amperage for controlling the disposition of the device, and means for preventing passage of devices of substantially the same resistance as the genuine to the outlet for the genuine without preventing the passage of the genuine thereto.

16. An apparatus of the character described comprising means for developing a current flow of predetermined amperage in the presence of a coin, token or like device of a definite resistance, means actuated by current of said predetermined amperage to the exclusion of current of other amperages for controlling the disposition of the good device, means for causing a fluctuating magnetic fluid to traverse the path of the device adjusted to allow passage of the good device therethrough and prevent passage of a copper device therethrough, and means for controlling said device controlling means and the circuit of said last named means to release the device if a spurious copper one and direct the same to its proper outlet.

17. An apparatus of the character described comprising electrical means for testing coins, tokens or like devices including elongated contact portions, a chute extending therefrom, means actuated in the presence of a device of predetermined resistance for controlling the disposition of the devices, means for causing a fluctuating magnetic field to traverse said chute, contacts for controlling the circuit thereof, a plunger for actuating said contacts, means on said plunger for dragging the device over said first named contact portions, means on said plunger for pressing said device against the contacts, and means on the plunger for locking said device controlling means in position to divert the good device to its proper outlet, said plunger upon return movement thereof releasing said device controlling means and then deenergizing said means for causing the fluctuating field.

18. An apparatus of the character described comprising an endless core, a coil mounted on one portion thereof and adapted to be traversed by an alternating current, a secondary member having a gap therein and mounted on said core about said coil, and a magnetic armature pivotally mounted on said core intermediate said coil and said secondary member and adjusted to be attracted by said core when a current of predetermined amperage is developed in said coil upon closing of said gap by a coin or device of predetermined resistance, said armature in the closed position thereof constituting part of the core embraced by said secondary member and serving to reduce the current flow in the coil.

19. An apparatus of the character described comprising electrical means for testing coins, tokens or like devices and for developing a current flow of predetermined amperage in the presence of a good coin or device of the same resistance, a relatively fixed chute for the good device, and the device of substantially the same resistance, an armature actuated in response to said current of predetermined amperage, a member carried thereby and having a slot adapted to receive the device in the normal position of the armature and directing the device laterally therefrom, and a slot adapted to receive the device when said armature is actuated and discharge the device into said chute, means for causing a fluctuating magnetic field to traverse said chute, and means controlled by said armature and cooperating with said chute, below the fluctuating field for controlling the disposition of the good and spurious devices passing through said chute.

20. An apparatus of the character described comprising electrical means for testing coins, tokens or like devices including contact portions, a guideway associated with said contact portions, a plunger movable in said guideway over said contact portions, said plunger having means for dragging the device over said contact portions, yieldable means carried by the plunger for pressing the device against the contact portions, means for retracting said pressing means in the upper and lower portions of the plunger, and means responsive to a current of predetermined amperage in the circuit of said electrical means for controlling the disposition of the device.

21. An apparatus of the character described comprising electrical means for testing coins, tokens or like devices including elongated contact portions of relatively low resistance, a guideway associated with said contact portions, a detent in said guideway to retain the device inserted against falling through said guideway, a plunger movable in said guideway having a projecting portion adapted to engage the upper edge of the device to drag the same past said detent and over said contact portions, a spring pressed pin on said plunger adapted to press the device against the contact portions, cam means on the guideway for retracting the pin in the upper and lower positions of the plunger, and means responsive to a predetermined current in the circuit of said electrical means for indicating whether the device is genuine or spurious.

22. An apparatus of the character described comprising a closed core, a coil thereon serving as an impedance traversed by alternating current, a secondary member embracing said core and having a gap therein providing elongated spaced contacts adapted to be bridged by a coin, token or like device, a guideway associated with said contacts, movable means associated with said guideway for dragging the device over said contacts and pressing the same into engagement therewith, means for retracting the pressing means at the limits of travel of the dragging means, and means actuated magnetically by said core and adjusted to be responsive only to the current developed in the presence of a device having substantially the resistance of the genuine for controlling the disposition of the device.

23. An apparatus of the character described comprising an endless core, a coil mounted thereon adapted to be traversed by an alternating current, a secondary member having a gap therein and mounted on said core, a magnetic armature pivotally mounted on said core and embraced by said secondary member, said armature being adjusted to be attracted by said core when a current of predetermined amperage is developed in said coil upon closing of said gap by a coin or device of predetermined resistance, and serving to control the disposition of the device, and said armature in the closed position thereof constituting part of the core, and serving to reduce the current flow in the coil.

24. An apparatus of the character described comprising electrical means including a guideway and contacts therein adapted to be bridged by a coin, token or like device for controlling the current in the circuit of the electrical means, an armature responsive to a current of predetermined amperage in the circuit, said armature carrying slotted portions, one slotted portion being adapted in the unattracted position of the armature to receive the device from the guideway and directly discharge the same, a fixed chute adapted to be aligned with the other slotted portion in the attracted position of the armature to receive the device, means for causing a fluctuating magnetic field to traverse the fixed chute to prevent passage of certain of the devices passing therethrough, and means controlled by the armature for controlling the disposition of the devices passing through the fixed chute.

25. An apparatus of the character described comprising an electrical means including contacts, a guideway associated therewith for coins, tokens or like devices, means for moving the device through said guideway along said contacts in pressing engagement therewith, means responsive to a current of predetermined amperage in the circuit of said electrical means for controlling the disposition of the device, and means controlled by said device moving and pressing means for locking the means for controlling the disposition of the device in attracted position.

26. An apparatus of the character described comprising an electrical means including contacts, a guideway associated therewith for coins, tokens or like devices, a plunger for moving a device through said guideway in pressing engagement with said contacts, means for releasing the pressure on the device at the end of the travel thereof, means responsive to a current of predetermined amperage in the circuit of the electrical means for controlling the disposition of the device, and a pin on said plunger adapted to lock said last named means when in attracted position, said pin remaining in locking relation upon return of the plunger until the disposition of the device is accomplished.

27. An apparatus of the character described comprising an impedance circuit and means including spaced contacts for controlling the current in said circuit, means for pressing a coin, token or like device into engagement with said contacts for developing a current in said circuit inversely proportional to the resistances of the devices presented, and for releasing the device, an armature adjusted to be responsive to a current of predetermined amperage for controlling the disposition of the devices, and means controlled by the device pressing and releasing means for locking the armature in attracted position after release of the device from the contacts to prevent retraction of the armature before the disposition of the device is accomplished.

28. An apparatus of the character described comprising an electrical means adapted to develop a flow of current in the presence of coins, tokens or like devices inversely proportional to the resistance of the devices, fluctuating magnetic means adjusted to allow passage of the genuine and prevent the passage of spurious devices of substantially the same resistance as the genuine therethrough, a chute for guiding devices from said electrical means past said fluctuating magnetic means, means below the fluctuating magnetic means for controlling the disposition of the devices from said chute, said last named means being actuated in response to a current of predetermined amperage in the circuit of said first named electrical means, and means for controlling the engagement and disengagement of the devices with said first named electrical means, said last named means controlling the circuit of the fluctuating magnetic means, and preventing the return of the current responsive means from attracted position until the genuine device is disposed of, and said last named means upon return thereof to initial position first releasing said current responsive means and then opening the circuit of the fluctuating magnetic means.

29. An apparatus of the character described comprising electrical means adapted to develop a current flow in the presence of a coin, token or like device inversely proportional to the resistance of the devices, a chute passing from said electrical means, magnetic means for subjecting said chute to a fluctuating magnetic field and adjusted to allow passage of the genuine and prevent passage of devices of greater responsiveness to eddy current effect than the genuine device, means cooperating with said chute below the magnetic means for controlling the disposition of the devices, said means being actuated by said electrical means and adjusted to be responsive to a current of predetermined amperage in the circuit thereof, and means for locking said current responsive means to prevent the return thereof from attracted position until the genuine device is disposed of, said last named means controlling the circuit of the fluctuating magnetic means and being movable to release the current responsive means before the fluctuating magnetic means is deenergized.

30. An apparatus of the character described comprising a chute for the passage of coins, tokens or like devices, and having outlets for devices of different responsiveness to eddy current effect, fluctuating current electromagnetic means having a core forming a gap receiving said chute above said outlets, and adapted to be traversed by a fluctuating magnetic field allowing certain devices to pass therethrough and preventing the passage of more responsive devices, means for controlling the circuit of the electromagnetic means, and means controlled adjunctively with the circuit of the electromagnetic means for the passage of the less responsive device to one outlet when said gap is energized, and of a more responsive device to the other outlet upon release of the device when said gap is deenergized.

31. An apparatus of the character described comprising a chute for the passage of coins, tokens or like devices, and having outlets for genuine and spurious devices, fluctuating current electromagnetic means having a core forming a gap receiving said chute above said outlets, and adapted to be traversed by a fluctuating magnetic field, said field when energized allowing a silver coin to pass therethrough and preventing the passage of a more responsive spurious device, and means controlled adjunctively with the circuit of said electromagnetic means for the passage of a genuine device to one outlet when said gap is energized, and of a spurious device to the other outlet upon release of the device when said gap is deenergized.

FAIRFIELD W. HOBAN.